United States Patent [19]
Freeman et al.

[11] Patent Number: 6,006,227
[45] Date of Patent: *Dec. 21, 1999

[54] DOCUMENT STREAM OPERATING SYSTEM

[75] Inventors: Eric Freeman, Branford; David H. Gelernter, Woodbridge, both of Conn.

[73] Assignee: Yale University, New Haven, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,255

[22] Filed: Jun. 28, 1996

[51] Int. Cl.$^6$ .................................................... G06F 17/30
[52] U.S. Cl. ................................. 707/7; 707/2; 707/102
[58] Field of Search .................................... 395/611, 616; 707/100, 102, 200, 2, 7

[56] References Cited

U.S. PATENT DOCUMENTS

| | | | |
|---|---|---|---|
| 5,063,495 | 11/1991 | MacPhail | 395/761 |
| 5,140,676 | 8/1992 | Langelaan | 395/777 |
| 5,159,669 | 10/1992 | Trigg et al. | 395/357 |
| 5,402,526 | 3/1995 | Bauman et al. | 706/49 |
| 5,448,729 | 9/1995 | Murdock | 395/615 |
| 5,530,859 | 6/1996 | Tobias, II et al. | 395/551 |
| 5,535,063 | 7/1996 | Lamming | 360/4 |
| 5,625,818 | 4/1997 | Zarmer et al. | 395/615 |
| 5,649,182 | 7/1997 | Reitz | 707/7 |
| 5,835,129 | 11/1998 | Kumar | 348/15 |
| 5,890,177 | 3/1999 | Moody et al. | 707/511 |

OTHER PUBLICATIONS

Cowart, Mastering Windows 3.1, 1992, chapter 12, pp. 396–417, Jan. 1, 1992.

Gelernter, The Cyber–Road Not Taken, The Washington Post, Apr. 3, 1994, 9 pages.

Freeman, Lifestreams Project Home Page, 3 pages, 1994–1996, Jan. 1, 1994.

Freeman, Lifestreams for the Newton, Steve Mann's Developers Corner, Oct. 31, 1995, 5 pages.

Steinberg, Lifestreams, Wired 5.02, Feb. 28, 1997, 11 pages.

Freeman et al, Lifestreams: Organizing your Electronic Life, AAAI Fall Symposium, Al Applications in Knowledge Navigation and Retrieval, Nov. 30, 1995, Cambridge MA, 6 pages.

Getting Results with Microsoft Outlook, copyright Microsoft Corporation 1995–1996, pp. 28–29, Jan. 1, 1995.

Nelson, Theodor H., The Right Way to Think About Software Design, In The Art of Human–Computer Interface Design, Brenda Laurel, (Ed.), (1990): pp. 235–243.

Landsdale, M., The Psychology of Personal Information Management, Applied Ergonomics, (Mar. 1988): pp. 55–66.

Malone, Thomas W., How Do People Organize Their Desks? Implications For The Design Of Office Information Systems., ACM Transactions On Office Systems, vol. 1, No. 1 (Jan. 1983): pp. 99–112.

*Primary Examiner*—Wayne Amsbury
*Attorney, Agent, or Firm*—Cooper & Dunham LLP

[57] ABSTRACT

A document stream operating system and method is disclosed in which: (1) documents are stored in one or more chronologically ordered streams; (2) the location and nature of file storage is transparent to the user; (3) information is organized as needed instead of at the time the document is created; (4) sophisticated logic is provided for summarizing a large group of related documents at the time a user wants a concise overview; and (5) archiving is automatic. The documents can include text, pictures, animations, software programs or any other type of data.

33 Claims, 6 Drawing Sheets

| WHO | ON | | | | | AT | ABOUT |
|---|---|---|---|---|---|---|---|
| Scott Fertig | Tue | Aug | 1 | 12:05 | EDT 1995 | 432-6433 | Port to PPC |
| Ward Mullins | Tue | Aug | 1 | 11:57 | EDT 1995 | 415 224-1912 | Tcl/Java discussion |
| Beth Freeman | Tue | Aug | 1 | 10:22 | EDT 1995 | 432-1287 | insurance |

Quote-O-Matic Stock Service for 5/16/95

GVIL     14.00
LMASX    20.84
ODWA    18.50
SPLS     27.12
TSA      19.25
lavtx     21.41

DOCUMENT STREAM OPERATING SYSTEM

FIELD OF THE INVENTION

The present invention relates to an operating system in which documents are stored in a chronologically ordered "stream". In other words, that is, as each document is presented to the operating system, the document is placed according to a time indicator in the sequence of documents already stored relative to the time indicators of the stored documents.

Within this application several publications are referenced by arabic numerals within parentheses. Full citations for these and other references may be found at the end of the specification immediately preceding the claims. The disclosures of all of these publications in their entireties are hereby incorporated by reference into this application in order to more fully describe the state of the art to which this invention pertains.

BACKGROUND OF THE INVENTION

Conventional operating systems frequently confuse inexperienced users because conventional operating systems are not well suited to the needs of most users. For example, conventional operating systems utilize separate applications which require file and format translations. In addition, conventional operating systems require the user to invent pointless names for files and to construct organizational hierarchies that quickly become obsolete. Named files are an invention of the 1950's and the hierarchical directories are an invention of 1960's.

Some conventional operating systems employ a "desktop metaphor" which attempts to simplify common file operations by presenting the operations in the familiar language of the paper-based world, that is, paper documents as files, folders as directories, a trashcan for deletion, etc. Also, the paper-based model is a rather poor basis for organizing information where the state of the art is still a messy desktop and where one's choices in creating new information paradigms is constrained [1].

Thus, conventional operating systems suffer from at least the following disadvantages: (1) a file must be "named" when created and often a location in which to store the file must be indicated resulting in unneeded overhead; (2) users are required to store new information in fixed categories, that is directories or subdirectories, which are often an inadequate organizing device; (3) archiving is not automatic; (4) little support for "reminding" functions are provided; (5) accessibility and compatibility across data platforms is not provided and (6) the historical context of a document is lost because no tracking of where, why and how a document evolves is performed. "Naming" a file when created and choosing a location in which to place the file is unneeded overhead: when a person grabs a piece of paper and starts writing, no one demands that a name be bestowed on the sheet or that a storage location be found. Online, many filenames are not only pointless but useless for retrieval purposes. Storage locations are effective only as long as the user remembers them.

Data archiving is an area where conventional electronic systems perform poorly compared to paper-based systems. Paper-based systems are first and foremost archiving systems, yet data archiving is difficult in conventional desktop systems. Often, users throw out old data rather than undertaking the task of archiving and remembering how to get the data back. If archiving and retrieval of documents is convenient, old information could be reused more often.

Reminding is a critical function of computer-based systems [2] [3], yet current systems supply little or no support for this function. Users are forced either to use location on their graphical desktops as reminding cues or to use add-on applications such as calendar managers.

A solution to these disadvantages is to use a document stream operating system. One such system is outlined in a 1994 article [4]. However, this article fails to address many of the disadvantages of conventional operating systems.

SUMMARY OF THE INVENTION

One object of the present invention is to provide a document stream operating system and method which solves many, if not all, of the disadvantages of conventional operating systems.

Another object of the present invention is to provide a document stream operating system in which documents are stored in one or more chronologically ordered streams.

An additional object of the present invention is to provide an operating system in which the location and nature of file storage is transparent to the user, for example, the storage of the files is handled automatically and file names are only used if a user chooses to invent such names.

A further object of the present invention is to provide an operating system which takes advantage of the nature of electronic documents. For example, a conventional paper document can only be accessed in one place, but electronic documents can be accessed from multiple locations.

Another object of the present invention is to organize information as needed instead of at the time the document is created. For example, streams may be created on demand and documents may belong to as many streams as seems reasonable or to none.

An additional object of the present invention is to provide an operating system in which archiving is automatic.

A further object of the present invention is to provide an operating system with sophisticated logic for summarizing or compressing a large group of related documents when the user wants a concise overview. In addition, this summarizing can include pictures, sounds and/or animations. Also, no matter how many documents fall into a given category, the operating system is capable of presenting an overview in a form so that all the documents are accessible from a single screen.

Also, an object of the present operating system is to make "reminding" convenient.

Another object of the present invention is to provide an operating system in which personal data is widely accessible anywhere and compatibility across platforms is automatic. Accordingly, this invention provides that computers using the operating system of the present invention need not be independent data storage devices, but also act as "viewpoints" to data stored and maintained on external systems such as the INTERNET. Thus, in accordance with the present invention users can access their personal document streams from any available platform such as a UNIX machine, a Macintosh or IBM-compatible personal computer, a personal digital assistant (PDA), or a set-top box via cable.

According to one embodiment of the invention a computer program for organizing one or more data units is provided. The computer program includes: (1) means for receiving one or more of the data units, each of which is associated with one or more chronological indicators; and (2) means for linking each of the data units according to the chronological indicators to generate one or more streams of data units. Other embodiments of the invention also provide: (1) chronological indicators including past, present, and future times; and (2) means for displaying the streams, wherein respective indicia representing the data units are displayed and each data unit includes textual data, video data, audio data and/or multimedia data. The means for displaying the streams may further include displaying selected segments of the streams corresponding to selected intervals of time. The means for receiving may further include means for receiving data units from the Word Wide Web or from a client computer.

According to another embodiment of the invention, a method of organizing one or more data units is provided including the steps of: (1) receiving one or more data units, each of which is associated with one or more chronological indicators; and (2) linking each of the data units according to the chronological indicators to generate one or more streams of data units. In other embodiments, the chronological indicators may include past, present, and future times. The method may further include the steps of: (1) displaying the streams, wherein respective indicia represent each data unit and each of the data units may be textual data, video data, audio data and/or multimedia data. The step of displaying the streams may further include the steps of: (1) receiving from a user one or more values indicative of one or more selected segments of the streams corresponding to selected intervals of time; and (2) displaying the segments of the streams corresponding to the selected intervals of time.

These and other advantages of the present invention will become apparent from the detailed description accompanying the claims and the attached figures.

DESCRIPTION OF THE DRAWINGS

FIG. 3 shows a list of summary types for the substream chosen in

FIG. 2 of the present invention;

DETAILED DESCRIPTION OF THE PREFERRED EMBODIMENTS

Figure 1:
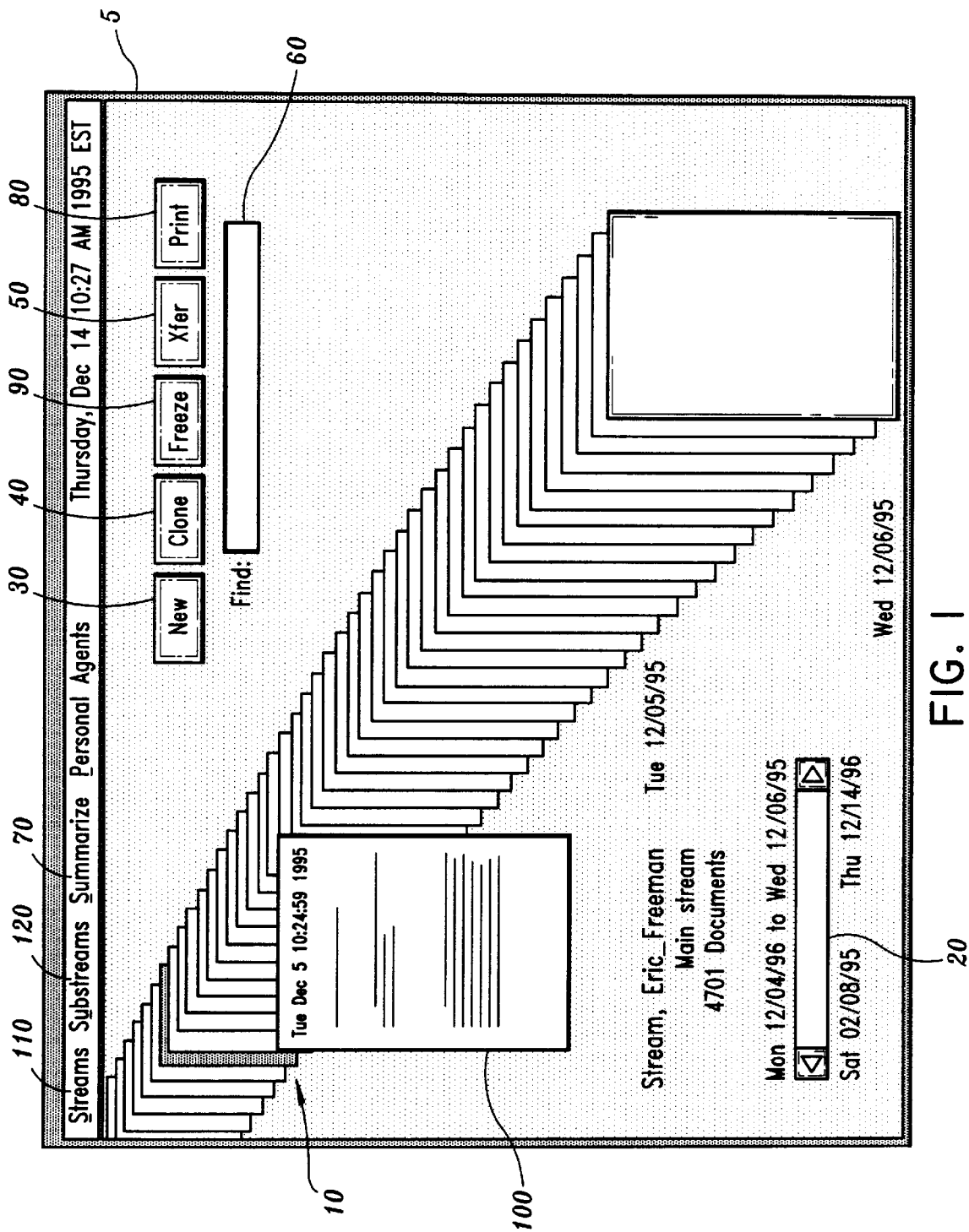
FIG. 1 shows a viewport in one embodiment of the present invention.

This invention is a new model and system for managing personal electronic information which uses a time-ordered stream as a storage model and stream filters to organize, locate, summarize and monitor incoming information. Together, streams and filters provide a unified framework that subsumes many separate desktop applications to accomplish and handle personal communication, scheduling, and search and retrieval tasks. One embodiment of the present invention utilizes a machine-independent, client/server open architecture so that users can continue to use the same conventional document types, viewers and editors.

A "stream" according to the present invention is a time-ordered sequence of documents that functions as a diary of a person or an entity's electronic life. Every document created and every document send to a person or entity is stored in a main stream. The tail of a stream contains documents from the past, for example starting with an electronic birth certificate or articles of incorporation. Moving away from the tail and toward the present and future, that is, toward head of the stream more recent documents are found including papers in progress or new electronic mail. A document can contain any type of data including but not limited to pictures, correspondence, bills, movies, voice mail and software programs. Moving beyond the present and into the future, the stream contains documents allotted to future times and events, such as, reminders, calendar items and to-do lists. Time-based ordering is a natural guide to experience. Time is the attribute that comes closest to a universal skeleton-key for stored experience. Accordingly, streams add historical context to a document collection with all documents eventually becoming read-only, analogously as history becomes "set in stone". The stream preserves the order and method of document creation. Also, like a diary, a stream records evolving work, correspondence and transactions because historical context can be crucial in an organizational setting.

One embodiment of this invention allows for basic operations to be perform on a stream: new, clone, transfer, find and summarize.

Users create documents by means of the new and clone operations. New creates a new, empty document and adds the document to the main stream. Clone duplicates an existing document and adds the duplicate to the main stream at a new time point. Documents can also be created indirectly through the transfer operation. The transfer operation copies a document from one stream to another stream. Creation of a document if "transparent" because documents, by default, are added to the at the present time point. Internally, the document is identified by a time indication so no name is required from the user for the document. Nevertheless, a user can optionally name a document is desired.

Some streams can be organized on the fly with the find operation. Find prompts for a search query, such as "all E-mail I haven't responded to," or "all faxes I've sent to Schwartz" and creates a substream. Substreams, unlike conventional, virtual or fixed directories which only list filenames, present the user with a stream "view" of a document collection. This view, according to the present invention contains all documents that are relevant to the search query. Also, unlike searches of conventional fixed directories, the substream is generated by default from all the documents in the main stream. Accordingly, individual substreams may overlap, that is, contain some documents that are the same and can be created and destroyed on the fly without affecting the main stream or other substreams.

The find operation creates a substream of the main stream or of another substream based on, for example, a boolean attribute-and-keyword expression or a 'chronological expression', for example, "my last letter to Schwartz". Also, substreams may point to the future, for example, "my next appointment".

Once created, substreams operate dynamically, that is, if a user allows a substream to persist, the substream will collect new documents that match the search criteria as documents arrive from outside the operating system or as the user creates the document. This dynamic operation provides automatic monitoring of information because the substream not only organizes the documents as received but also filters for incoming information. For example, a substream created with the query "find all documents created by other people" would subsume a user's mailbox and automatically collect all arriving mail from other users. A substream remains in existence until destroyed by the user and acts as a filter by examining each new document that enters the main stream.

Although a document may belong to any number of substreams, the document also enters and remains on the main stream. A substream, in other words, is a "subset" of the main stream document collection. In other words, a way of looking at the main stream so as to exclude certain documents temporarily.

The summarize operation "compresses" or "squish" a stream to generate one or more overview documents. The content of an overview document depends on the type of documents in the stream. For instance, if the stream contains the daily closing prices of all the stocks and mutual funds in a user's investment portfolio, the overview documents may contain a chart displaying the historical performance of particular securities and the user's net worth. As another example, if the substream contains a list of tasks a user needs to complete, the overview document might display a prioritized "to-do" list. Thus, the summarize operation collapses a stream into a summary document. This summary document is a "live" document which is updated as additional documents are added to the main stream.

The type of summary depends on the type of documents in the substream. In one embodiment of the present invention at least one general "squish" function is provided no matter which stream is to be squished. Typically, however, the user will have a number of different squishers to choose from, for example, one squisher might produce a summary in words, while another squisher might produce a graph. Also "custom squishers" may be supplied by third parties or created by the user.

Another aspect of the invention is that applications execute "inside" a stream document leaving any output in that document. Thus, running an application is a variant of the new operation. For example, to run a spreadsheet application such as Lotus 1-2-3, a user creates a new document at the head of the main stream, specifically, a "live" spreadsheet document. The application itself is stored on the main stream, or located by means of a calling card that points to another stream containing the application.

A stream has three main portions: past, present, and future. The "present" portion of the stream holds "working documents", which also includes the timepoint in the stream where new documents are created and where incoming documents are placed. As documents age and newer documents are added, older documents pass from the user's view and enter the "past portion" where the documents are eventually "archived". By disappearing from view old information is automatically cleared away so the old information will not clutter up the workspace. At some future point if documents in the past portion are needed, such documents can be located with the find operation even if the past document has already been archived.

The "future" portion of the stream allows documents to be created in the future. Future creation is a natural method of posting reminders, for example, meeting dates and scheduling information. The system allows users to dial to the future by selecting a future timepoint for a document. The present invention keeps the document until that future time occurs. When the time of documents timepoint arrives the reminder document is brought into view and the document enters the present portion of the stream.

One embodiment of the present invention is implemented in a client/server architecture running over the Internet. The server is the workhorse of this embodiment handling one or more streams by storing all main stream and substream documents. Each view of a stream is implemented as a client of the server and provides the user with a "viewpoint" interface to document collections, that is, streams. The "look and feel" of the viewport may be different for different computing platforms but each viewport should support the basic operations.

One embodiment of the present invention implements a client viewport using graphically based X Windows, another embodiment implement a client viewport solely with text in standard ASCII (American Standard Characters for Information Interchange) and yet another embodiment implements a client viewport for the NEWTON personal digital assistant (PDA). The X Windows viewport provides the full range of functionalities including picture and movie display. In contrast the text-only viewport has a mail-like interface although all the basic operations are available. Also, because the NEWTON PDA lacks substantial internal memory and relies on slow external communications, that is low bandwidth, a minimal stream-access method is provided.

The X Windows viewport embodiment is shown in FIG. 1. The interface is based on a visual representation of the stream metaphor 5. Users can slide the mouse pointer 10 over the document representations to "glance" at each document, or use the scroll bar 20 in the lower left-hand corner to move through time, either into the past or into the future portion of the stream.

Color and animation indicate important document features. A red border in one embodiment means "unseen" and a blue border means "writable". Open documents may be offset to the side to indicate when the document is being edited. In this embodiment incoming documents slide in from the left side and newly created documents pop down from the top and push the steam backwards by one document into the past.

External applications are used to view and edit documents which the user can select by clicking on the documents graphical representation. The external applications speed the learning process significantly because new users can continue to use familiar applications for example, conventional UNIX application such as emacs, xv, and ghostview, to create and view documents while using streams to organize and communicate the documents.

The X Windows interface prominently displays the basic operations, that is, New 30, Clone 40, Xfer 50 (that is, transfer), Find 60, and Summarize 70 as buttons and/or menus. As discussed previously the New button creates a new document and adds the document to the stream at the "present" timepoint. The Clone button duplicates an existing document and places the copy in the stream. The Xfer button first prompts the user for one or more mail addresses and then forwards the selected document. The find operation is supported through a text entry box 60 that allows the user to enter a boolean search query which results in a new substream being created and displayed. The summarize menu 70 generates a new document which displays information from documents in a stream in a desired format, for example, a graph.

The X Windows interface of this document also provides additional buttons. The Print button 80 copies a selected document to a printer where documents may be either printed conventionally or moved to a printer stream. A software agent which can be associated with the stream forwards each new document to an appropriate printer. The Freeze button 90 makes a document read-only.

Pulldown menus are used to select documents from streams or existing substreams, create summaries, initiate personal agents and change the clock.

The Streams menu 110 allows the user to select from a list of locally available streams.

Figure 2:
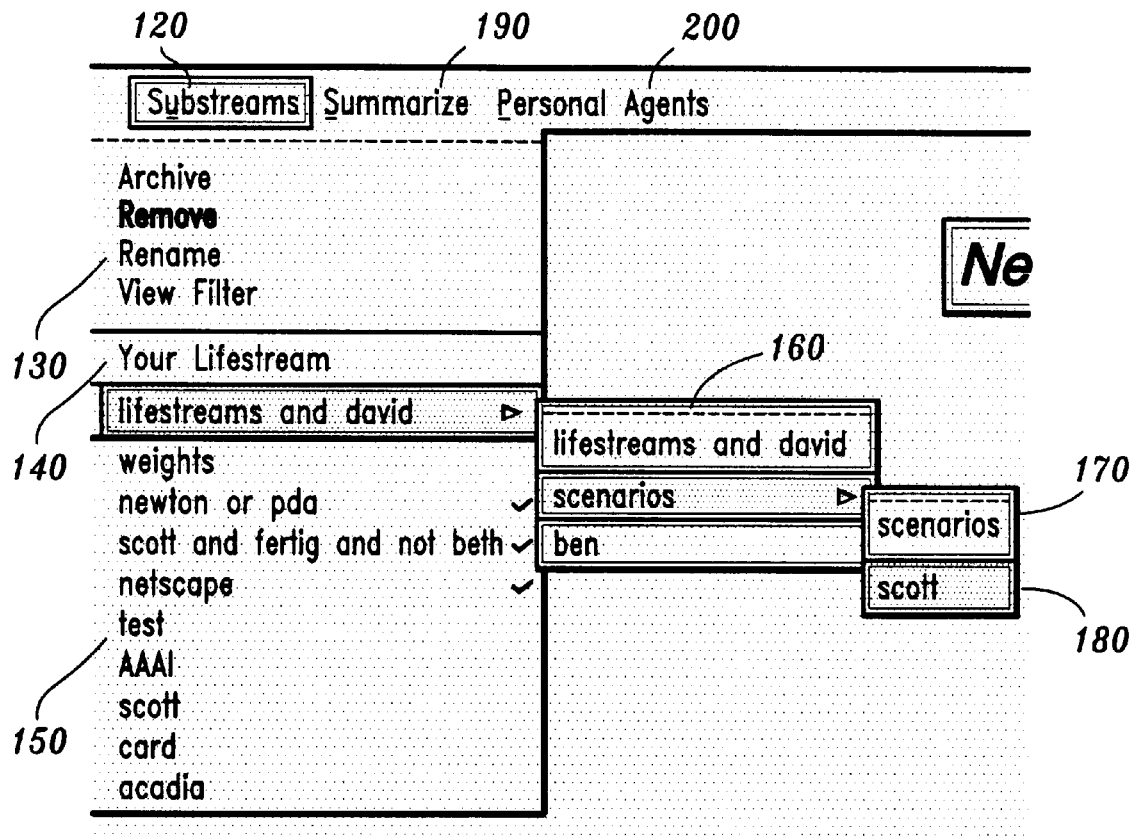
FIG. 2 shows a substream menu in one embodiment of the present invention.

FIG. 2 shows the Substreams menu 120 of one embodiment of the present invention. This menu is divided into three sections. The first section 130 contains a list of operations that can be performed on substreams, for example, remove. The second section 140 contains one menu entry labeled "Your Lifestream", and causes the viewport to display a user's main stream. The third section 150 lists all of the user's substreams. As indicated by this third section, substreams can be created in an incremental fashion, that is, one substream generated from another resulting in a nested set of menus. In this example the nested menus were created by first creating a substream "lifestreams and david" 160 from the main stream and then creating two substreams from this substream, "scenarios" and "ben" 170. Substream "scott" 180 was created from the "scenarios" substream. Semantically this incremental substreaming amounts to a boolean 'and' of each new query with the previous substream's query.

Figure 3:
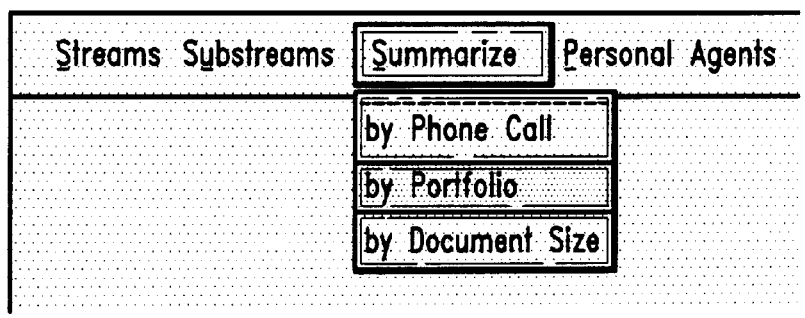

FIG. 3 shows the summarize menu 190 which lists the possible summary types. Choosing any of these menu options creates a substream summary and a new document containing the summary is placed on the stream.

The Personal Agents menu 200 lists a number of available software agent types. Personal software agents can be added to the user interface in order to automate common tasks.

Figure 4:
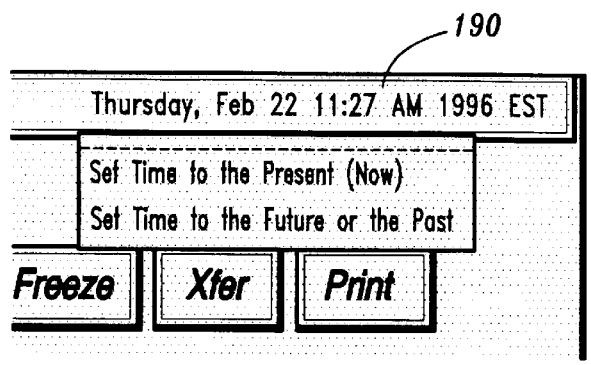
FIG. 4 shows the time display in one embodiment of the present invention.
Figure 5:
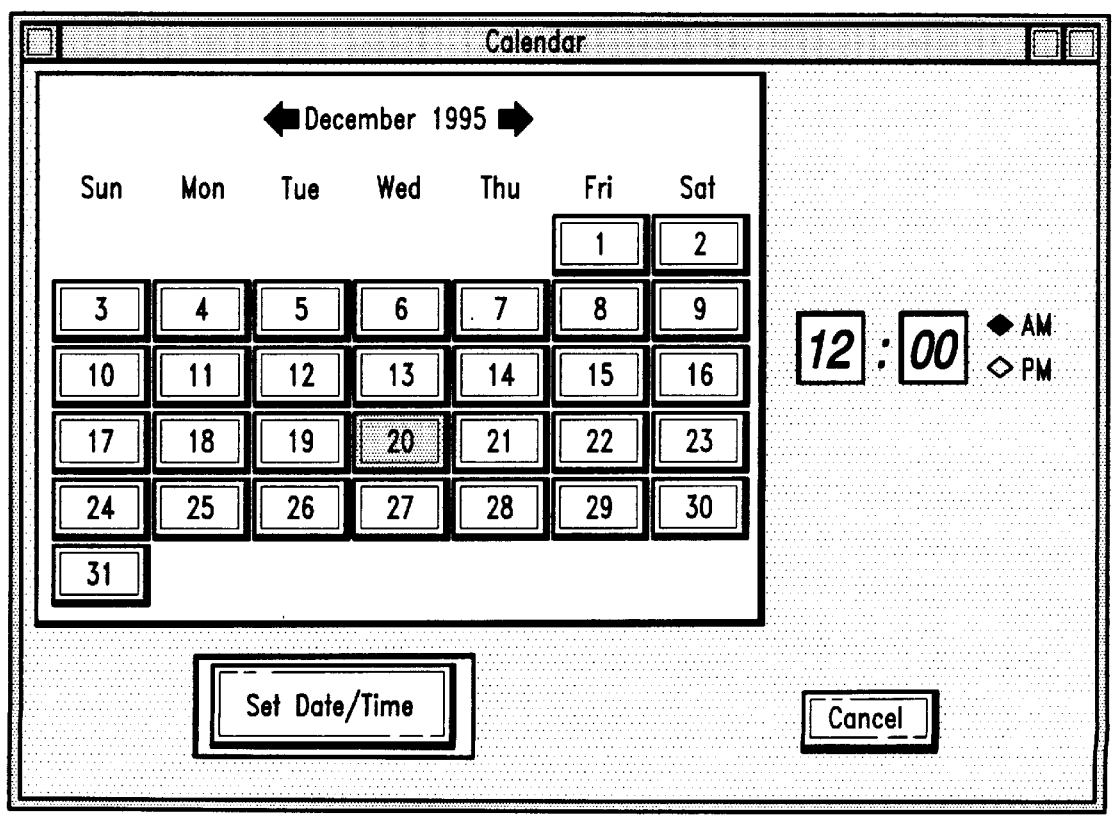
FIG. 5 shows a calendar-based dialog box in one embodiment of the present invention.

The embodiment illustrated in FIG. 4 always displays the time in the upper right hand corner of the viewport interface. This time display also acts as a "time" pull-down menu 190 that allows the user to set the viewport time to the future or past via a calendar-based dialog box as illustrated in FIG. 5. Setting the viewport time causes the cursor to point to that timepoint position in the stream such that all documents forward of that timepoint, that is, towards the head of the stream have a future timestamp and all documents behind that timepoint, that is, towards the tail, have a past timestamp. As time progresses, this cursor moves forward towards the head of the stream. When the cursor slips in front of the present timepoint "future" documents are added to the visible part of the stream in the viewport, just like new mail arrives.

The effect of setting the time to the future or past is to reset the time-cursor temporarily to a fixed position designated by the user. Normally the user interface displays all documents from the past up to the time-cursor. Setting the time-cursor to the future allows the user to see documents in the future part of the stream. Creating a document in the future results in a document with a future timestamp. Once the user is finished time-tripping, the user can reset to the present time by selecting the "Set time to present" menu option in the time menu.

In one embodiment of the present invention "browse cards" 100 are employed so that when the user touches a document in the stream-display with the cursor, a browse card appears. The purpose of the browse card is to help the user identify a document by providing the user some idea of the document's contents in a small window. The content of browse cards is an abbreviated version of a document which as been compressed into an micro-document like an index card. In one embodiment, the browse card creation operation does header stripping so that the browse card displays the first non-trivial words in a document. In another embodiment, complex analysis is performed on the document contents so that 'most important' words, pictures and/or sounds are presented.

Another embodiment of the present invention provides "calling cards" which represent or point to a stream or substream Every stream has a calling card and the only way to reference a stream is via this calling card. In this embodiment the find operation performs as follows: (1) the user provides a search query; (2) an appropriate substream is generated; (3) the substream's calling card is generated; and (4) the new calling card is deposited as a new document at the head of the main stream. Every duplicated calling card bears on the face text, an icon or both. In the case of the find operation, the new calling card is marked with the argument supplied by the user for the search query, for example "from: Schwartz and Lifestreams" or "last letter from Piffel". As a default in this embodiment, the interface will automatically display the new substream.

Another embodiment of the present invention allows documents to be grouped explicitly into a substream. With this feature the user marks, that is, selects all documents to be included in the substream and groups the selected documents into a substream by creating a new calling card. The new calling card comes equipped with a system-created icon which is marked on all documents that are part of the new stream and the user may add any other notation to the face of the new calling card, for example, "these should be merged together to produce the Zeppelin report."

In the embodiments with calling cards the "transfer" operation takes two arguments: a document and a calling card so that the document is copied onto the stream designated by the calling card. The document may itself be a calling card and depending on instructions from the user, either the calling card itself or the stream designated by the calling card is copied onto the new stream.

Each main stream in this embodiment has a calling card which allows 'inter-main stream' communication. To communicate a user includes on the face of the calling card for the user's main stream whatever information the user is willing to make public. Other users wanting to send that electronic mail will need a copy of that user's calling card, which might be, for example, "Rock Q. Public, Blimp Mechanic, Passaic N.J."

To give only limited access to user's stream, a user provides a copy of the calling card customized to provide the desired access. Minimal access gives other users append-only privileges, that is, user B can send user A mail, but cannot view anything on user A's stream. Access restrictions beyond "minimal" are stated in terms of substreams. In other words, a calling card gives access to all documents contained in the specified substream unless that document is also contained on one of specified excluded substreams.

The present invention allows a stream document to contain another stream, that is a 'stream envelope'. A stream envelope is equivalent to a 'value' calling card versus the 'reference' calling cards discussed above. In other words, rather than point to another stream with a calling card, the stream envelope contains a copy all the documents from the other stream. For example, user A transfers to user B a substream consisting of all Zeppelin-manual correspondence which contains many documents. However, a single new document appears on user B's stream: a stream envelope. The stream envelope may be opened yielding the many documents of the forwarded stream.

According to the present invention, a text-editor designed specifically for stream A can treat a document as a stream of bytes so that software agents designed to 'ride' streams could ride documents as well. Also, the stream find operation can scan the streamed document and synchronization based on stream properties can be applied to the streamed document.

Streams can be copied and combined into new streams, that is, streams can be merged. For example, if a user acquires stream segments from ten electronic newspapers and magazines all covering the same one-month period, the segments can be merged in a sorted order into a single combined stream.

Another feature of the present invention is a card gallery which consists of some reasonable number of microdocuments, for example twelve, arranged in such a way that each is always fully visible on the viewport for example, in two columns of 6 each at the right of the display. Each micro-document is a calling card or a micro-browse-card (MBC) to a "regular" document on the stream or in a squish. The micro browse card in the card gallery represent documents a user has been working on. Whenever a user opens a document or creates a substream or squish, the corresponding micro browse card is added to the card gallery. A user can re-open the document, squish or have the viewport display the substream, by clicking on, or otherwise selecting, the corresponding micro browse card.

The micro browse card is administered as a least-recently-used cache, that is, new cards are dealt on top of the least-recently-used existing card, however, users can override this mechanism and place or lock a card in the gallery. For example, a live squish can act as weather-station, appointment calendar, stock ticker or other current-status reporter if the user locks the micro browse card for the squish in the gallery.

Because a users' card gallery includes by default the calling cards of streams the user has recently opened, the card gallery acts, to the extent streams are used as Web sites, as a World Wide Web "hot list."

In one embodiment of the present invention at least some part of the stream is in the form of a receding stack of upright rectangles, framed in such a way that only the top line of each document is visible. A foreshortened viewing angle yields a view that is approximately a right triangle, the bottom edge aligned with the bottom of the display and the left edge aligned with the display's left border.

In another embodiment of the inventive operating system a 'slide rule' bar display is provided which is labelled with the endpoints of the stream, that is, the dates of the farthest-past and farthest-future documents. The document density can be illustrated, for example, by the amount of color saturation of the bar at any point. This type of display aids the user because some days, weeks, months or other time period have more associated documents, some have fewer. The slide rule has a magnifier that the user can slide via a mouse, for example up and down the bar. The magnifier obscures the portion of the sliderule that lies beneath, but the obscured segment is replaced by an enlarged view of the small part of the stream starting at the point touched by the upper edge of the magnifier or, some similar protocol for defining the starting point of the magnified segment. By sliding the magnifier, you change the part of the stream currently displayed in the main perspective view.

In another embodiment of the present invention at least some part of the stream is in the form of a conventional calendar month display. With this display, the stream-segment associated with day n appears as a list of document headers in n's calendar box.

To contemplate the future instead of the past, according to one embodiment of the present invention, a user can reverse the stream so that the head of the stream now appears in front, with the nearest-future document immediately behind that document, next-nearest behind that and so forth. The user then looks from the present into the future so that furthest-away document in the display equals furthest-away in future time.

All documents older than some date d may be moved by the server from immediately-accessible storage to cheaper, long-term storage. When a document is archived in this way, however, the browse card of that document may remain available in immediately-accessible storage, so that the archived document appears in the regular way in the viewport. When a user opens an archived document, the user may incur some delay as the server locates and reloads the body of the document.

Automatic archiving is a feature of the standalone embodiment and user-managed web site embodiment. In either embodiment, the streams operating system monitors remaining disk space and when available space is low, the operating system asks the user to pop in some diskettes or other storage media. Similarly when an archived document needs to be reloaded, the operating system tells the user which diskettes or other storage media to insert. In another embodiment of the present invention a chat feature is provided. If two users want to chat online in UNIX TALK style; the user creates a new stream and each user focusses the viewport on that new stream. To make a comment, a user pops a new document on the stream head with the comment contained as text inside the document. The stream synchronization properties allow many users to manipulate a stream concurrently, and allow a user to block at the end waiting for the arrival of a new document which would mean in this case awaiting the next comment.

A chat stream by its nature provides: (1) permanent record and (2) support for multiple parties to a conversation. A chat stream is in this sense is a real-time bulletin board. In this regard a network bulletin board may be stored in a stream providing: (1) archived comments that can be searched and retrieved using the standard streams operations; (2) synchronization characteristics like a chat stream; and (3) a bulletin board that can be located via the find operation.

In another embodiment of the present invention any software agent with the necessary access can ride your stream. Therefore streams can be the basis of groupware systems implemented for example as a flock of agents. For example, when user A's wants to schedule a meeting, a software agent departs from user A's stream to visit the streams of each of the other intended participants. Each user's stream lists the current appointments in the stream's future portion, and each user also includes a document giving the user's general availability in pre-arranged terms so that the meeting-maker software agent can understand. When the software agent finds an appropriate meeting time, the software agent posts a document to each stream's future and creates a new stream for the meeting itself. The software agent forwards the calling card of the meeting stream to each participant. This new stream serves as a chat stream on which the participants can discuss the meeting beforehand, accumulate any material developed during the meeting itself and persists when the meeting is over as a record and a vehicle for post-meeting discussions.

In the following embodiments a stream naturally provides a structure for storing technical an electronic versions of a newspaper or magazine.

In addition, a mail-order firm might store its catalog in a stream with each document describing one item. A top page can embed calling cards as hyperlinks so that the streams pointed-to are updated automatically by the persistent substream mechanism. Each user can also reformat the catalog to taste by creating a substream containing descriptions of whatever sort of object interests the user.

In another embodiment of the present invention a phone conversation is stored as a time-ordered sequence of spoken sounds or as electronic representations. When two users want to have a phone conversation, the users can use software such as a software agent, that creates a new stream and hands each user the calling card. Each user's 'phone agent' tosses digitized representations of speech frames onto the stream and grabs each new frame that appears, turning each speech frame into sound. In this scheme, phone and voicemail are integrated in the all-purpose stream context and can be manipulated using the standard stream operations.

Additionally, in another embodiment of the present invention a television source can be stored as a time-ordered sequence of sound-and-image frames. Such television information is an archive as well as a realtime source and can be searched and substreamed. A television set is merely a viewport. Also, scheduling information can be stored in the television stream's future and tuning into a television station only requires double-clicking on the appropriate calling card. Similar embodiments can provide for radio stations, music sources, etc.

A stream according to the present invention can be controlled by a voice-interface as well as a computer and thereby be accessed via a conventional phone. The voice interface would allow: (1) the stream to be searched and manipulated; (2) new objects to be installed; (3) objects to be transferred; and (4) other capability.

The following embodiment discusses how the present invention is used for electronic mail. To send a message, the user creates a new document, for example by clicking on the New button and composes the message using a favorite editor. After composition, the message document is sent with a push of the Xfer button. Similarly, existing documents are easily forwarded to other users, or can be cloned and replied to. While all mail messages, both incoming and outgoing, are intermixed with other documents in the stream, the user can create a mailbox by substreaming on documents created by other users. A user can also create substreams that contain a subset of the mailbox substream, such as "all mail from Bob", or "all mail I haven't responded to".

With the present invention, a reminder can be generated as future electronic mail, that is a user can send mail that will arrive in the future. If the user dials to the future before writing a message document, when the message document is transferred the message document will not appear on recipient's stream until either that time arrives or the recipient happens to dial the recipient's viewport to the set creation date. In the present, the document will be in the stream data structure but the viewport will not show the document. By appearing just-in-time and not requiring the user to switch to yet another application, these reminders are more effective than those included in a separate calendar or scheduling utility program.

Figures 6A, 6B:
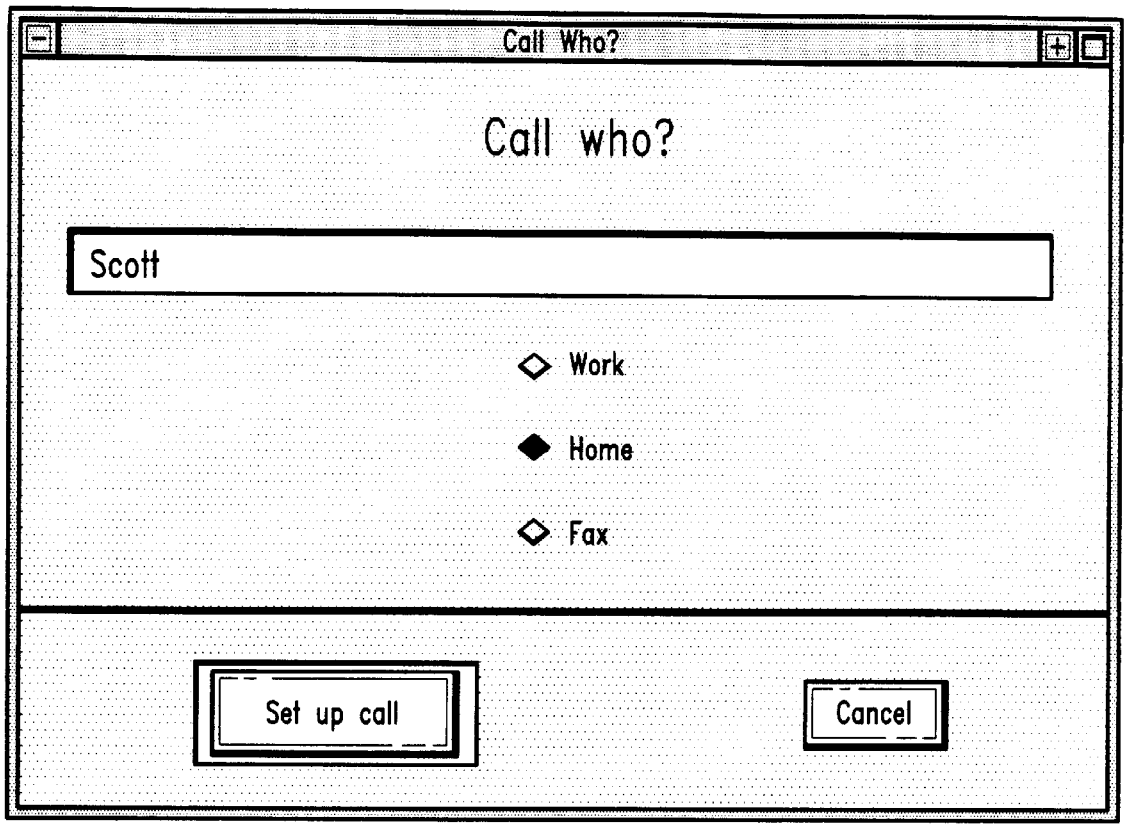
FIG. 6a shows a dialog box in connection with a phone call in one embodiment of the present invention.
FIG. 6b shows a summary of phone calls in one embodiment of the present invention.
Figures 7, 8A:
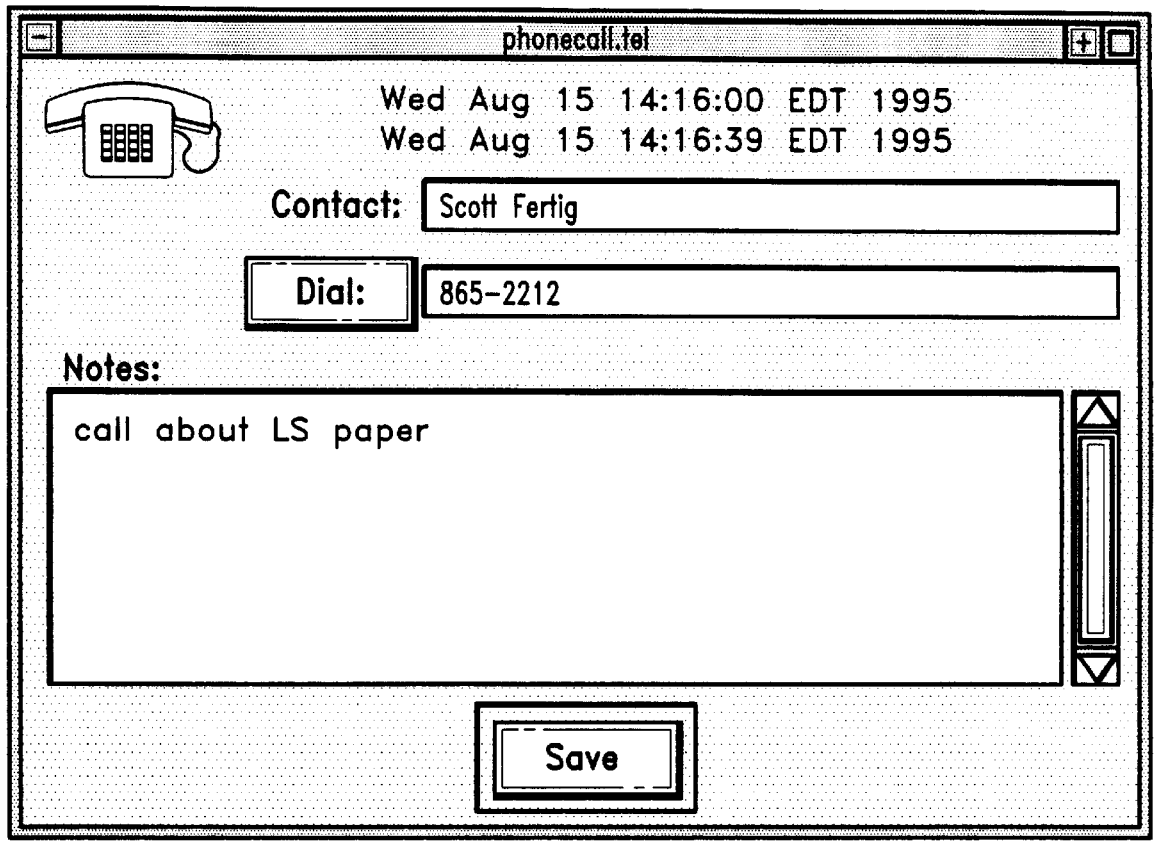
FIG. 7 shows a phone call record dialog box in one embodiment of the present invention.
FIG. 8a shows text data used by one embodiment of the present invention.

One embodiment of the present invention supports an electronic business cards document type as well as a 'phone call record' document for noting the date and time of phone contacts. In addition, the task of creating a phone call record is automated through a personal agent. The personal software agent is automatically attached to the personal agent menu so that anytime a user wants to make a call the use chooses "Make Phonecall" from the personal agent menu. The agent is spawned and the dialog box in FIG. 6a appears. The user types in the name of the callee and the agent searches the current stream for a business card with that name. If the name is found, the software agent creates and fills in the appropriate entries of the phone call record as seen in FIG. 7. This functionality is similar to the use of the personal assistant on the Newton personal digital assistant. The user can later use the streams summarize operation to summarize the phone calls made. This results in a report as shown in FIG. 6b.

In another embodiment of the present invention this functionality is extended to include the functions of a time manager. Time managers generally track the billable hours a professional spends on one or more projects. In streams this is easily accomplished by creating a timecard that marks the starting and ending time of each task. These timecards are just thrown onto the stream as used. Then, before each billing period, the stream is summarized by the timecards, resulting in a detailed billing statement for each contract.

Another embodiment of the present invention organizes a user's personal finance. Large number of users already track their checking accounts, savings, investments, and budgets with applications such as QUICKEN. The types of records and documents used in these applications such as electronic checks, deposits, securities transactions, reports are conveniently stored and generated by streams.

Figure 8B:
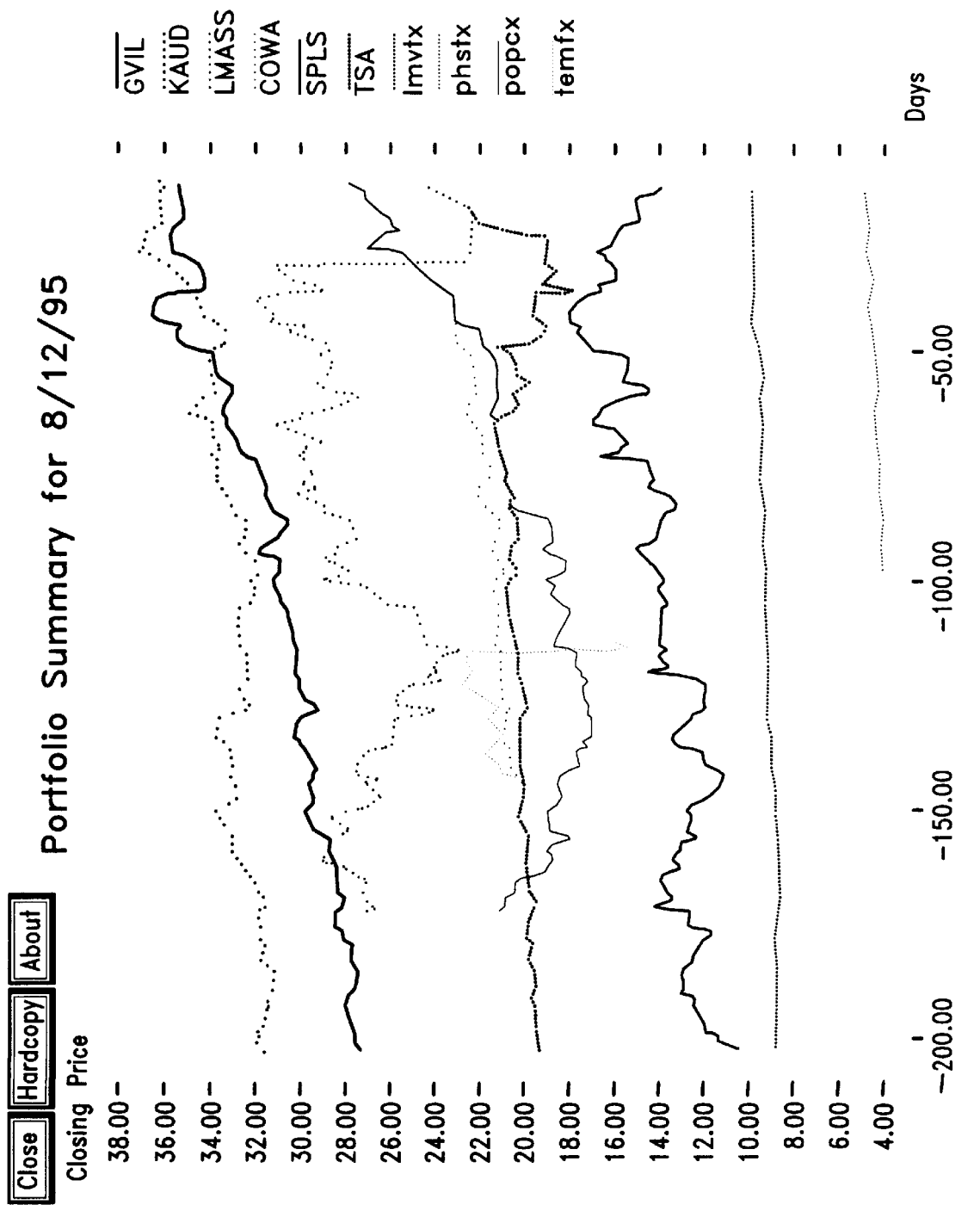
FIG. 8b shows the result of a summarize operation in one embodiment of the present invention.

For example, a stock quote service may forward the daily closing prices of a given portfolio to a user's stream at the end of every business day. These documents are as shown in FIG. 8a. Such documents can list each stock and mutual fund along with its closing price, giving the user a method of calculating the value of the user's assets on a specific day. But if the user wants higher-level view of the portfolio over time the summarize operation can be used. For example, the user first selects a substream containing the stock quote documents and selects the "summarize by portfolio" menu item. This operation compresses the data into a single chart of historical data which summarize the portfolio documents in the substream. This result is illustrated in FIG. 8b.

Another embodiment of present invention provides a stream-based checking account. Each check written creates a record on the users stream. Some of these checks are electronic checks sent to companies with an online presence; other checks are transcribed from written checks. The user, in this embodiment, employs a personal software agent to help balance his checkbook. At year's end the user runs a tax summary which squishes the financial information in the users stream onto income tax forms which can be sent electronically to the Internal Revenue Service.

Streams can also be used for budgeting, tracking expenditures, etc. Streams contain everything a user deals with in the user's electronic life in a convenient and searchable location.

As discussed previously, every user can send out custom calling cards that grant access to a user's stream. Thus, the particular user's stream can function as a personal World Wide Web site such that the web site is merely a subset of the user's main stream or a substream. For the convenience of external users, a user can generate a "guide to this stream" document that functions as a top page. In the context of the present invention, a hyperlink, or a bookmark is just a calling card. By double clicking, or some comparable mechanism, on a calling card the viewport displays the specified stream. Embedding a link from one document to another document means to embed calling cards.

The present invention's personal web site provides more features than a conventional worldwide user side because: (1) the web site and personal information site are unified and maintained simultaneously with the same toolset; (2) visitors to the site use the same interface as for the visitor's own stream, that is, the visitor can browse, create substreams and squish; (3) visitors can be given customized access levels so that friendly visitors get to see more; and (4) the personal web site can filter incoming documents.

Streams of the present invention are designed to work with conventional World Wide Web browsers, thus opening a document of type web bookmark causes the appropriate browser to fire-up as an application the way a text editor fires up when the user opens a text document. However, streams also provide an indigenous web-browsing model. Key features such as calling cards and find provide this functionality so that the viewport itself functions as the browser.

Streams may also be quite useful for managing information outside of the system. For example, keeping track of web bookmarks is difficult and bookmarks are inconvenient to pass to other users. Conventional systems accomplish those transactions by copying a Web address from a web browser to an electronic mail message which the recipient then copies from electronic mail back to recipient's browser and adds this web address as a bookmark. Streams solve both of these problems.

In one embodiment, an agent watches each user's bookmark file for each time a new bookmark is added and then adds the same bookmark to a stream as a new Web address document. The effect of opening a Web address document in a stream is that the web browser comes to the foreground and attempts to connect to the Web address. In this way streams create a bookmark substream while at the same time making the data in the bookmarks readily available to any other search a user may make.

Passing Web addresses around is trivial, the user merely copies the Web address document to another user's stream (a one-step process) and the Web address is automatically included in the recipient bookmark substream.

A stream is a data structure that can be examined and to the extent possible manipulated by many processes simultaneously. Also a process may block the end of a stream, that is, suspend the stream operation, until awakened when a new document appears on the stream head. Streams need to support the block-at-the-end operation so that a software agent or what amounts to the same thing, that is, a substream or a live squish document can examine each new document arriving at the stream.

A stream must support simultaneous access because: (1) a user creates many software agents which may need to examine the stream concurrently; and (2) a user may have granted other users limited access to the user's stream, and the user will want access to this stream even while the other users access the stream.

One embodiment of the present invention is configured such that each server may support three to four simultaneous users with stream sizes on the order of 100,000 documents (perhaps a year or two of documents for the average user). In another embodiment, the operating system is configured such that lifestreams may have millions of documents or more. The substreaming aspect of one embodiment of the present invention is efficiently implemented using an inverse index of the document collection maintained by the server. No real performance problems with respect to retrieval have occurred. Given the very large indices that are being used on the Internet the retrieval scheme is expected to scale to large document collections.

Since a user is unlikely look at 10,000 documents at once and discern any usable information, the present invention does not provide the user with an entire document collection at once. Instead "cursors" are used to allow the user to view segments of the document collection and to load in more segments as needed.

One embodiment of the invention provides a single-threaded server which allows a single point of access. Other embodiments of the present invention utilize a multi-server and multi-threaded approach which provides a more scalable architecture.

Regarding the term "agent" used in this application, it is noted that this term refers one of three kinds of embedded computations: personal agents, document agents, and stream agents. Personal agents are typically attached to the user interface and can automate tasks or can learn from the user's interactions with streams. Document agents live on documents and are spawned by various events, for example, the first time that a document is accessed. Stream agents are attached to streams and execute whenever the stream changes in some way, for example, a new document appears on the stream.

Further, regarding the term "document", it is noted that this term includes traditional text based files, electronic mail files, binary files, audio data, video data, and multimedia data.

Additionally, this document stream operating system can be implemented as an independent operating system with all required subsystems such as: a storage subsystems in software and/or hardware for writing documents to disc drive, tape drives and the like; interrupt handling subsystems; and input/output subsystems. However, the present invention also encompasses implementations which utilize subsystems from other operating systems such as the Disk Operating System (DOS), WINDOWS, and OPERATING SYSTEM 7. In such implementations, the graphic user interface (GUI) of the other operating system can be replaced by the present invention viewports. Alternatively, the present invention can operate as a document stream utility for the other operating system.

It must be noted that although the present invention is described by reference to particular embodiments thereof, many changes and modifications of the invention may become apparent to those skilled in the art without departing from the spirit and scope of the invention, which is only limited by the appended claims. For documents may have associated attributes used to locate the document during a search, for example, a special code word selected by the user.

References

[1] Theodor Nelson. The right way to think about software design. In The Art of Human-Computer Interface Sesign (Ed.) Brenda Laurel, 1990.

[2] Thomas W. Malone. How do people organize their desks?Implications for the design of office information systems. ACM Transactions on Office Systems, 1(1):99–112, January 1983.

[3] M. Lansdale. The psychology of personal information management. Applied Ergonomics, March 1988.

[4] David Gelernter. The cyber-road not taken. The Washington Post, April 1994.

What is claimed is:

1. A computer system which organizes each data unit received by or generated by the computer system, comprising:

means for generating a main stream of data units and at least one substream, the main stream for receiving each data unit received by or generated by the computer system, and each substream for containing data units only from the main stream;

means for receiving data units from other computer systems;

means for generating data units by the computer system;

means for selecting a timestamp to identify each data unit;

means for associating each data unit with at least one chronological indicator having the respective timestamp;

means for including each data unit according to the timestamp in the respective chronological indicator in the main stream; and means for maintaining the main stream and the substreams as persistent streams.

2. The computer system of claim 1, wherein each timestamp is selected from the group consisting of: past, present, and future times.

3. The computer system of claim 1, wherein each data unit includes textual data, video data, audio data and/or multimedia data.

4. The computer system of claim 1, wherein the means for receiving further comprises means for receiving data units from the World Wide Web.

5. The computer system of claim 1, wherein said means for receiving further comprises means for receiving data units from a client computer.

6. The computer system according to claim 1, further comprising:

means for displaying alternative versions of the content of the data units.

7. A computer system according to claim 1 further comprising:

means for summarizing the contents of data units in one of the streams to generate one or more overview data units and for including the overview data unit in one of the streams.

8. A computer system according to claim 7, wherein the means for summarizing further comprises means for continuously updating the overview data units to include changes in the contents of data units in the stream being summarized.

9. A computer system according to claim 1 further comprising:

means for archiving a data unit associated with a timestamp older than a specified time point while retaining the respective chronological indicator and/or a data unit having a respective alternative version of the content of the archived data unit.

10. The computer system of claim 1, wherein the computer program further comprises:

means for operating on any of the streams using a set of operations selected by a user.

11. The computer system of claim 1 further comprising:

means to generate substreams from existing substreams.

12. A computer system as in claim 1, further comprising:

means for generating a data unit comprising an alternative version of the content of another data unit; and means for associating the alternative version data unit with the chronological indicator of the another data unit.

13. A method which organizes each data unit received by or generated by a computer system, comprising the steps of:

generating a main stream of data units and at least one substream, the main stream for receiving each data unit received by or generated by the computer system, and each substream for containing data units only from the main stream;

receiving data units from other computer systems;

generating data units in the computer system;

selecting a timestamp to identify each data unit;

associating each data unit with at least one chronological indicator having the respective timestamp;

including each data unit according to the timestamp in the respective chronological indicator in at least the main stream; and maintaining at least the main stream and the substreams as persistent streams.

14. The method of claim 13, wherein each timestamp is selected from the group consisting of: past, present, and future times.

15. The method of claim 13, further comprising the step of displaying the streams on a display device as visual streams.

16. The method of claim 15, wherein the step of displaying the streams further comprises the steps of:

a) receiving from a user one or more indications of one or more selected segments of the streams corresponding to one or more selected intervals of time, and b) displaying the selected segments.

17. The method of claim 13, wherein each data unit includes textual data, video data, audio data and/or multimedia data.

18. The method of claim 13, further comprising the step of:

providing access to a first stream from a second stream by generating a data unit indicating the first stream.

19. The method of claim 13, further comprising the steps of:

selecting access privileges to provide to a first stream from a second stream; and providing access to the first stream from the second stream according to the access privileges.

20. The method of claim 13, further comprising the step of:

displaying data from one of the data units in abbreviated form.

21. The method of claim 13, further comprising the step of:

summarizing the contents of data units in a stream to generate one or more overview data units and including the overview data unit in one of the streams.

22. The method of claim 13, further comprising the step of:

archiving data units having timestamps older than a specified time point.

23. A computer system for organizing each data unit received by or generated by the computer system, comprising:

means for generating a main stream of data units and at least one substream, the main stream for receiving each data unit received by or generated by the computer system, and each substream for containing data units only from the main stream; means for associating each data unit with at least one chronological indicator having a respective timestamp which identifies the data unit; means for including each data unit according to the timestamp in a respective chronological indicator in the main stream; means for maintaining the main stream and substreams as persistent streams;

means for generating a data unit having indicia to allow access to a first stream from a second stream;

means for including the data unit having the indicia in the second stream; and means for providing access to the first stream from the second stream in accordance with the indicia.

24. A computer system according to claim 23 further comprising:

means for providing limited access to the first stream from the second stream by generating a data unit indicating access privileges to the first stream.

25. A computer system for organizing each data unit received by or generated by the computer system, comprising:

means for generating a main stream of data units and at least one substream, the main stream for receiving each data unit received by or generated by the computer system, and each substream for containing data units only from the main stream; means for associating each data unit with at least one chronological indicator having a respective timestamp which identifies the data unit; means for including each data unit according to the timestamp in a respective chronological indicator in the main stream; means for maintaining the main stream and the substreams as a persistent streams;

means for representing one or more data units of a selected stream on a display device as document representations, each document representation including the timestamp of the respective data unit and the order of appearance of each data representation on the display device determined by the timestamp of the respective data unit;

means for selecting which data units are represented on the display device by selecting one of the document representations and displaying document representations corresponding to data units having timestamps within a range of a timepoint; and means for selecting one or more of the document representations with a pointing device so that the data units represented by the selected document representations are further displayed with a second document representation comprising an alternative version of the content of the respective data unit.

26. A computer system as in claim 25, wherein the document representations form a visual stream having a three-dimensional effect.

27. A computer system as in claim 26, wherein the three-dimensional effect further comprises a perspective view.

28. A computer system as in claim 25, wherein each document representation comprises a polygon and the polygons overlap to form a visual stream of polygons.

29. A computer system as in claim 25, wherein the alternative version is an abbreviated version.

30. A computer system as in claim 25, wherein the alternative version is a caption version.

31. A computer system as in claim 25, wherein the alternative version is an expanded version.

32. A computer system as in claim 25, further comprising:

means for selecting one or more alternative versions of the content of a respective data unit to display another alternative version of the content of the data unit.

33. A computer system as in claim 25, further comprising:

means for updating the display device to provide a document representation for data units associated with chronological indicators having timestamps which become the present time.

\* \* \* \* \*

US006006227C1

(12) EX PARTE REEXAMINATION CERTIFICATE (8298th)

United States Patent
Freeman et al.

(10) Number: US 6,006,227 C1
(45) Certificate Issued: Jun. 7, 2011

(54) DOCUMENT STREAM OPERATING SYSTEM

(75) Inventors: Eric Freeman, Branford, CT (US); David H. Gelernter, Woodbridge, CT (US)

(73) Assignee: Mirror Worlds, LLC, Tyler, TX (US)

Reexamination Request:
No. 90/010,506, Apr. 23, 2009

Reexamination Certificate for:
Patent No.: 6,006,227
Issued: Dec. 21, 1999
Appl. No.: 08/673,255
Filed: Jun. 28, 1996

(51) Int. Cl.
*G06F 17/30* (2006.01)

(52) U.S. Cl. .................. 707/695; 707/752; 707/783; 707/914; 707/916; 707/917; 707/999.002; 707/999.007; 707/999.102; 707/E17.008; 707/E17.058

(58) Field of Classification Search .................. 709/232
See application file for complete search history.

(56) References Cited

U.S. PATENT DOCUMENTS

| | | |
|---|---|---|
| 4,586,035 A | 4/1986 | Baker et al. |
| 4,831,758 A | 5/1989 | Williams et al. |
| 5,031,346 A | 7/1991 | Herring et al. |
| 5,060,135 A | 10/1991 | Levine et al. |
| 5,063,495 A | 11/1991 | MacPhail |
| 5,140,676 A | 8/1992 | Langelaan |
| 5,150,410 A | 9/1992 | Bertrand |
| 5,159,669 A | 10/1992 | Trigg et al. |
| 5,241,671 A | 8/1993 | Reed et al. |
| 5,247,437 A | 9/1993 | Vale et al. |
| 5,283,864 A | 2/1994 | Knowlton |
| 5,287,448 A | 2/1994 | Nicol et al. |
| 5,297,032 A | 3/1994 | Trojan et al. |
| 5,299,122 A | 3/1994 | Wang et al. |
| 5,303,361 A | 4/1994 | Colwell et al. |
| 5,355,602 A | 10/1994 | Menke et al. |
| 5,402,526 A | 3/1995 | Bauman et al. |
| 5,430,710 A | 7/1995 | Mueller et al. |
| 5,448,729 A | 9/1995 | Murdock |
| 5,479,602 A | 12/1995 | Baecker et al. |
| 5,499,330 A | 3/1996 | Lucas et al. |
| 5,504,852 A | 4/1996 | Thompson-Rohrlich |
| 5,528,739 A | 6/1996 | Lucas et al. |
| 5,530,859 A | 6/1996 | Tobias, II et al. |
| 5,535,063 A | 7/1996 | Lamming |

(Continued)

FOREIGN PATENT DOCUMENTS

JP 6-180661 6/1994
WO WO 2003/001345 A1 1/2003

OTHER PUBLICATIONS

Carriero et al.. "The Lifestreams' Approach to Reorganize the Information World" Apr. 1995. (TR–1070v1").
Carriero et al.. "The Lifestreams' Approach to Reorganize the Information World" Apr. 1995. (TR–1070v2").
Freeman, Lifestreams Project Home Page, 3 pages, 1994–1996, Jan. 1, 1994.
W3C: A Little History of the World Wide Web, http://www.w3.org/History.html, (Accessed Jul. 15, 2010).

(Continued)

*Primary Examiner*—Christopher E Lee

(57) ABSTRACT

A document stream operating system and method is disclosed in which: (1) documents are stored in one or more chronologically ordered streams; (2) the location and nature of file storage is transparent to the user; (3) information is organized as needed instead of at the time the document is created; (4) sophisticated logic is provided for summarizing a large group of related documents at the time a user wants a concise overview; and (5) archiving is automatic. The documents can include text, pictures, animations, software programs or any other type of data.

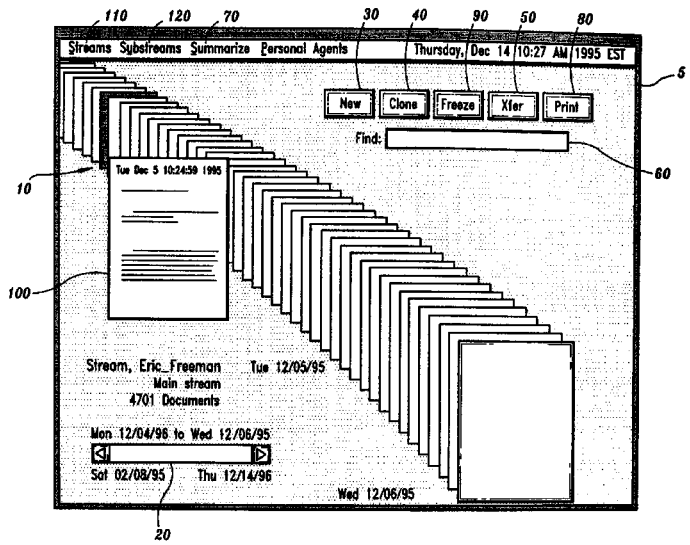

U.S. PATENT DOCUMENTS

| | | | |
|---|---|---|---|
| 5,542,086 A | 7/1996 | Andrew et al. | |
| 5,543,088 A | 8/1996 | Halbirt | |
| 5,586,237 A | 12/1996 | Baecker et al. | |
| 5,589,892 A | 12/1996 | Knee et al. | |
| 5,600,833 A | 2/1997 | Senn et al. | |
| 5,603,025 A | 2/1997 | Tabb et al. | |
| 5,613,134 A | 3/1997 | Lucus et al. | |
| 5,616,876 A | 4/1997 | Cluts | |
| 5,621,874 A | 4/1997 | Lucas et al. | |
| 5,621,906 A | 4/1997 | O'Neill et al. | |
| 5,625,818 A | 4/1997 | Zarmer et al. | |
| 5,649,182 A | 7/1997 | Reitz | |
| 5,649,188 A | 7/1997 | Nomura et al. | |
| 5,701,582 A | 12/1997 | DeBey | |
| 5,724,567 A | 3/1998 | Rose et al. | |
| 5,729,730 A | 3/1998 | Wlaschin et al. | |
| 5,737,737 A | 4/1998 | Hikida et al. | |
| 5,758,324 A | 5/1998 | Hartman et al. | |
| D395,297 S | 6/1998 | Cheng et al. | |
| 5,764,972 A | 6/1998 | Crouse et al. | |
| 5,771,355 A * | 6/1998 | Kuzma | 709/232 |
| 5,778,364 A | 7/1998 | Nelson | |
| 5,784,620 A | 7/1998 | Isham | |
| D398,299 S | 9/1998 | Ballay et al. | |
| 5,835,129 A | 11/1998 | Kumar | |
| 5,835,789 A | 11/1998 | Ueda et al. | |
| 5,890,177 A | 3/1999 | Moody et al. | |
| 5,905,992 A | 5/1999 | Lucas et al. | |
| 5,912,668 A | 6/1999 | Sciammarella et al. | |
| 5,937,417 A | 8/1999 | Nielsen | |
| 6,006,227 A | 12/1999 | Freeman et al. | |
| 6,012,072 A | 1/2000 | Lucas et al. | |
| 6,012,074 A | 1/2000 | Lucas et al. | |
| 6,151,610 A | 11/2000 | Senn et al. | |
| 6,178,409 B1 | 1/2001 | Weber et al. | |
| 6,199,082 B1 | 3/2001 | Ferrel et al. | |
| 6,202,058 B1 | 3/2001 | Rose et al. | |
| 6,243,724 B1 * | 6/2001 | Mander et al. | |
| 6,262,732 B1 | 7/2001 | Coleman et al. | |
| 6,396,513 B1 | 5/2002 | Helfman et al. | |
| 6,401,097 B1 | 6/2002 | McCotter et al. | |
| 6,457,017 B2 * | 9/2002 | Watkins et al. | |
| 6,466,237 B1 * | 10/2002 | Miyao et al. | |
| 6,496,857 B1 * | 12/2002 | Dustin et al. | |
| 6,523,048 B2 * | 2/2003 | DeStefano | |
| 6,638,313 B1 * | 10/2003 | Freeman et al. | |
| 6,639,876 B2 | 10/2003 | Kalis et al. | |
| 6,714,489 B2 | 3/2004 | Kalis et al. | |
| 6,725,427 B2 * | 4/2004 | Freeman et al. | |
| 6,768,999 B2 * | 7/2004 | Prager et al. | |

OTHER PUBLICATIONS

Gelernter, David, "The Cyber–Road Not Taken", The Washington Post, Apr. 3, 1994.

Bolt, Richard A., "Spatial Data–Management", Massachusetts Institute of Technology, 1979.

Lansadale, M. W., et al., "Memoirs: A personal Multimedia Information System", The Proceedings of the Fifth Conference of the British Computer Society Human Computer Interaction Specialist Group University of Nottingham, Sep. 1989.

Pemberton, Steven, "Not With A Whimper", SIGCHI, Apr. 1998.

Miller, James R., "The Apple Advanced Technology Group—An Introduction to the Special SIGCHI Bulletin Issue", SIGCHI, Apr. 1998.

Russell, Daniel M., "The ATG Knowledge Management Technologies Laboratory", SIGCHI, Apr. 1998.

Miller, James R., "An Overview of the ATG Intelligent Systems Program", SIGCHI, Apr. 1998.

Miller, James R., et al., "From Documents to Objects: An Overview of LiveDoc", SIGCHI, Apr. 1998.

Bonura, Thomas, et al., "Drop Zones: An Extension to Live-Doc", SIGCHI, Apr. 1998.

Boguraev, Branimir, et al., "An Architecture for Content Analysis of Documents and Its Use in Information and Knowledge Tasks", SIGCHI, Apr. 1998.

Boguraev, Branimir, et al., "Dynamic Document Presentation", SIGCHI, Apr. 1998.

Nardi, Bonnie, et al., "An Online Digital Photography Course for High School Teachers", SIGCHI, Apr. 1998.

Shulka, Shilpa V., "Hit Squads & Bug Meisters", SIGCHI, Apr. 1998.

Rose, Daniel E., "Beyond Search: The Information Access Research Group at Apple", SIGCHI, Apr. 1998.

Russell, Daniel M., "User Experience Research Group", SIGCHI, Apr. 1998.

Walker, William F., Rapid Prototyping of Awareness Services Using a Shared Information Server, SIGCHI, Apr. 1998.

Bellegarda, Jerome R., "Interaction–Driven Speech Input", SIGCHI, Apr. 1998.

Machiraju, N. Rao, "The ATG Learning Communities Laboratory: An Overview", SIGCHI, Apr. 1998.

Bellamy, Rachel, et al., "Learning Conservations", SIGCHI, Apr. 1998.

Houde, Stephanie, et al., "In Search of Design Principles for Tools and Practices to Support Communication Within a Learning Community", SIGCHI, Apr. 1998.

Roddy, Brian J., et al., "Interface Issues in Text Based Chat Rooms", SIGCHI, Apr. 1998.

Spohrer, Jim, "ATG Education Research: The Authoring Tools Thread", SIGCHI, Apr. 1998.

Graves, Mike, et al., "Unfamiliar Ground: Designing Technology to Support Rural Healthcare in India",SIGCHI, Apr. 1998.

Mountford, S. Joy, "A History of the Apple Human Interface Group", SIGCHI, Apr. 1998.

Harris, Jed, et al., "Discourse Architecture", SIGCHI, Apr. 1998.

Singer, Samuel Weller, "Researches into the History of Playing Cards", Printed by T. Bensley and Son, 1816.

"Playing Poker at Egan's" (image), http://www.orww.org/Harney_Cattle/Student_Reports/Images/11–Poker_1882.jpg(ca. 1882).

"Commercial America", Philadelphia Commercial Museum, Jul. 1911.

"Eleventh Annual Report of the Trustees of the Boston State Hospital", Published by Wright & Potter Printing Co., 1920.

"System—The Magazine of Business", A. W. Shaw Company, 1921.

Ibberson, J.R., MD, "The Business Side of General Practice", Canad. M.A.J., vol. 72, Apr. 15, 1955.

Carlbom, Ingrid, et al., "Planar Geometric Projections and Viewing Transformations", Computing Surveys, vol. 10, No. 4, pp. 465–502, Dec. 1978.

Schmandt, Christopher Martin, "Pages Without Paper", Bachelor of Science Thesis at the Massachusetts Institute of Technology, Dec. 1978.

Donelson, William C., "Spatial Management of Information", Architecture Machine Group, Massachusetts Institute of Technology, Proceedings of the 5th Annual Conference on Cumputer Graphics and Interactive Techniques, 1978.

Bolt, Richard A., "Put–That–There": Voice and Gesture at the Graphics Interface, Architecture Machine Group, Massachusetts Institute of Technology, ACM, 1980.

Halasz, Frank, et al., "Analogy Considered Harmful", Association for Computing Machinery, 1981.

Bolt, Richard A., "Gaze–Orchestrated Dynamic Windows", Architecture Machine Group, Massachusetts Institute of Technology,, Cambridge Massachusetts, ACM, Computer Graphics, vol. 15, No. 3, Aug. 1981.

Williams, Gregg, "The Lisa Computer System", BYTE Publications, Inc., Feb. 1983.

Williams, Gregg, "The Apple Macintosh Computer ", BYTE Publications, Inc., Feb. 1984.

Anderson, John J., "Atari 520ST: A Reborn Atari Once Again Points the Way to the Next Generation", Creative Computing, vol. 11, No. 10, Oct. 1985.

Greenberg, Saul, et al., "Issues and Experiences in the Design of a Window Management System", Canadian Information Processing Society—Edmonton Conference, 1986.

Henderson, D. Austin, Jr., et al., "Rooms: The Use of Multiple Virtual Workspaces to Reduce Space Contention in a Window–Based Graphical User Interface", ACM Trans. On Graphics, vol. 5, No. 3, pp. 211–243, Jul. 1986.

Robek, Mary F., et al., "Information and Records Management", 3rd ed., Glencoe Publishing Co., pp. 160–163, 179–181, 192–193, 224–229, 248–251, (1987).

Lynch, Vincent, "American Jukebox—The Classic Years", Chronicle Books, pp. 36, 74–75, (1990).

Robertson, G. G., et al., "Cone Trees: Animated 3D Visualizations of Hierarchical Information", UIR–R–1991–06, (1991).

Card, S. K., et al., "The Information Visualizer: An Information Workspace", UIR–R–1991–01, (1991).

MacKinlay, Jock D., et al., "The Perspective Wall: Detail and Context Smoothly Integrated", UIR–R–1991–03, (1991).

Kay, Alan C., "The Early History of Smalltalk", ACM SIGPLAN Notices, vol. 28, No. 3, Mar. 1993.

Adams, Michael, et al., "Jukeboxes", Schiffer Publishing, Ltd., pp. 85–86, 103–104, 105, (1996).

Card, Stuart K., et al., "The WebBook and the Web Forager: An Information Workplace for the World–Wide Web", CHI '96 Conference on Human Factors in Computing Systems, Apr. 13–18, 1996.

Meyers, Brad A., "A Brief History of Human–Computer Interaction Technology", Interactions, pp. 44–54, 1998.

Bardini, Thierry, "Bootstrapping", Stanford University Press, Chapter 6, pp. 143–181, (2000).

Sutherland, Ivan Edward, "Sketchpad: A Man–Machine Graphical Communication System", PhD Dissertation at the Massachusetts Institute of Technology, Jan. 1963.

Engelbart, Doug, "The Click Heard Round the World", Wired Magazine, 2004.

Reimer, Jeremy, "A History of the GUI", arstechnica.com, May 5, 2005.

"The Library of Congress Classification System", Aug. 2006.

Barnes, Susan B, "Alan Kay: Transforming the Computer into a Communication Medium", IEEE Annals of the History of Computing, 2007.

Calamar, Gary et al., "Record Store Days: From Vinyl to Digital and Back Again", Sterling Publishing Co., 2009.

Masinter, Larry, "Document Management, Digital Libraries and the Web", Jun. 9, 1995.

Herot, Christopher F., "Spatial Management of Data", Computer Corporation of America, ACM Trans. On Database Systems, vol. 5, No. 4, pp. 493–514, Dec. 1980.

Newman, William M., "A System for Interactive Graphical Programming", Harvard University, ACM Spring Joint Computer Conference, 1968.

Schultz, Jan R., et al., "An Initial Operational Problem Oriented Medical Record System—for Storage, Manipulation and Retrieval of Medical Data", University of Vermont, ACM Spring Joint Computer Conference, 1971.

Donelson, William C., "Spatial Management of Data", Massachusetts Institute of Technology, 1977.

"Lotus Magellan Explorer's Guide", Lotus Development Corp., 1989.

Factor, Michael, et al., "Real–Time Data Fusion in the Intensive Care Unit", Yale University, Nov. 1991.

Gelernter, David, et al., "Graphics Interfaces & Sensor Activator Extensions for the Process Trellis Software", Yale University, Oct. 31, 1995.

Harrison, Beverly L., et al., "Timelines: An Interactive System for the Collection and Visualization of Temporal Data", Proceedings of Graphic Interface '94, pp. 141–148, (1994).

Gerlenter, David, "Applications and Systems for Large Scale Adaptive Parallelism", Mar. 22, 1997.

Date, C. J., "An Introduction to Database Systems, 3rd ed., The Systems Programming Series, vol. 1", IBM Corporation, Addison–Wesley Publishing Company, 1981.

"The Billboard" (magazine), Jan. 26, 1946.

"Billboard" (magazine), Jul. 4, 1992.

Swineheart, Daniel C., et al., "A Structural View of the Cedar Programming Environment", ACM Trans. On Programming Languages and Systems, vol. 8, No. 4, Oct. 1986.

Lucas, Peter, et al., "Workscape: A Scriptable Document Management Environment", Maya Design Group, Conference Companion CHI '94, Apr. 1994.

Bailay, Joseph M., "Designing Workscape: An Interdisciplinary Experience", Maya Design Group, Conference Companion CHI '94, Apr. 1994.

Perkins, Roderick, et al., "Inventing the Lisa User Interface", Interactions, pp. 40–53, (1997).

Feiner, Steven, et al., "An Experimental System for Creating and Presenting Interactive Graphical Documents", ACM Trans. On Graphics, vol. 1, No. 1, pp. 59–77, Jan. 1982.

Houde, Stephanie, "Iterative Design of an Interface for Easy 3–D Direct Manipulation", CHI '92, May 1992.

"Announcing Retrospect and Retrospect Remote 3.0", Business Wire, Aug. 8, 1995.

"Dantz Delivers Retrospect Archives", MacWEEK, Inc., Jun. 10, 1989.

"Archiving Easy on Retrospect: Uniform Interface to Storage Devices", MacWEEK, Inc., Feb. 21, 1989.

"Mac the Knife, GmbH Rumors", MacWEEK, Inc., Jan. 31, 1989.

"Dantz, ChrisMac drive over to CD–R", MacWEEK, Inc., Dec. 11, 1995.

"System 7.5.2 Fixes", MacWORLD, Oct. 1, 1995.

"Danz to Waltz in with Friendlier Retrospect", MacWEEK, Inc., Jul. 31, 1995.

"Dantz Eases Network Backup", InfoWorld, Jan. 11, 1993.

"Retrospect User's Guide", 1st Ed., Dantz Development Corporation, 1989.

"Retrospect User's Guide", 2nd Ed., Dantz Development Corporation, 1993.

Spence, Robert, et al., "Data Base Navigation: An Office Environment for the Professional", Behavior and Information Technology, vol. 1, No. 1, pp. 43–54, (1982).

Johnson, Jeff, et al., "The Xerox Star: A Retrospective", IEEE Computer, Sep. 1989.

Shneiderman, Ben, "The Eyes Have It: A Task by Data Type Taxonomy for Information Visualizations", University of Maryland, Proc. Visual Languages, Sep. 1996.

Plaisant, Catherine et al. "Lifelines: Visualizing Personal Histories", ACM CHI '96 Conference Proc., pp. 221–227, color plate 518, Apr. 1996.

Musthaler, Linda, "A Tall Order for Document Managers", Network World, pp. 35–40, Jul. 18, 1994.

Seiden, Peggy, et al., "Information Retrieval Systems for Microcomputers", Library Hi Tech, vol. 3, Issue 1, pp. 41–54, (1985).

"Zylab Includes Auto–Indexing in Zyindex 3.0", InfoWorld, vol. 10, Issue 18, p. 16, May 2, 1988.

Kappes, Sandra, et al., "Document Management for the Knowledge Worker System", US Army Corps of Engineers, USACERL ADP Report 95/38, Nov. 15, 1995.

"Verity K2 Toolkit Search System Administration Guide V2.2", Verity Incorporated, Jul. 20, 2000.

Cleveland, Gary, "Overview of Document Management Technology", International Federation of Library Associations and Institutions Universal Dataflow and Telecommunications Core Programme, Jun. 1995.

Factor, Michael, et al., "The Trellis Architecture for Intelligent Monitors", Department of Computer Science, Yale University, 1990.

Bush, Vannevar, "As We May Think", Life Magazine, Sep. 10, 1945.

Lansadale, M. W., et al., "Memoirs: A personal Multimedia Information System", Elseiver Science Publishers B. V., 1989.

Lansadale, M. W., et al., "Memoirs: A personal Multimedia Information System", 1995.

Bush, Vannevar, "As We May Think", The Atlantic Monthly, Jul. 1945.

"On Location Manual, v. 1.0", On Technology, Inc., 1990.

Coolidge, C. M., "Dogs Playing Poker (His Station and Four Aces)" (image), 1903.

Musthaler, Linda, "DMS's getting mix–and–match wardrobe," Network World, pp. 38–41, Jan. 8, 1996.

Kullberg, Robin Lee, "Dynamic Timelines: Visualizing Historical Information in Three Dimensions", Massachusetts Institute of Technology, 1995.

Cowart, Mastering Windows 3.1, 1992, chapter 12, pp. 396–417, Jan. 1, 1992.

Freeman, Lifestreams for the Newton, Steve Mann's Developers Corner, Oct. 31, 1995, 5 pages.

Freeman et al., Lifestreams: Organizing your Electronic Life, AAAI Fall Symposium, AI Applications in Knowledge Navigation and Retrieval, Nov. 30, 1995, Cambridge, MA, 6 pages.

Landsdale, M., The psychology of Personal Information Management, Applied Ergonomics, (Mar. 1988): pp. 55–66.

Malone, Thomas W., How Do People Organize Their Desks? Implications For The Design Of Office Information Systems, ACM Transaction On Office Systems, vol. 1, No. 1 (Jan. 1983): pp. 99–112.

Nelson, Theodor H., The Right Way to Think About Software Design. In The Art of Human–Computer Interface Design, Brenda Laurel, (Ed.), (1990): pp. 235–243.

Steinberg, Lifestreams, Wired 5.02, Feb. 28, 1997, 11 pages.

Getting Results with Microsoft Outlook, copyright Microsoft Corporation 1995–1996, pp. 28–29, Jan. 1, 1995.

Gobel, David P., Using Lotus Magellan, Que Corporation (1989).

Retrospect User's Guide, version 3, first edition, Dantz Development Corporation (1989–1995).

Rose, Daniel E., et al., "Content Awareness in a File System Interface: Implementing the 'Pile' Metaphor for Organizing Information", ACM–SIGIR '93 (1993).

Mander, Richard, et al., "A 'Pile' Metaphor for Supporting Casual Organization of Information", ACM–CHI '92 (May 3–7, 1992).

HyperCard Basics and HyperCard Stack Design Guidelines, Apple Computer, Inc. (1990).

"The 'Lifestreams' Approach to Reorganizing the Information World", Yaleu/DSC/TR–1070 (1995).

Gifford, David K., et al., "Semantic File Systems", ACM–SFS '91 (1991).

"On Location 2.0.01" by ON Technology (1990–1991).

Bolour, A., et al., "The Role of Time in Information Processing: A Survey", ACM–SIGART Bulletin, Issue 80 (Apr. 1982).

Rahm, Erhard, "Recovery Concepts for Data Sharing Systems" IEEE (1991).

Inside Macintosh, Addison–Wesley Publishing Company (Aug. 1992).

O'Toole, James W., et al., "Names should mean What, not Where" (1992).

Staples, Loretta, "Representation in Virtual Space: Visual Convention in the Graphical User Interface", ACM–Interchi '93 (Apr. 24–29, 1993).

Goldberg, David., et al., "Using collaborative filtering to weave an information Tapestry", Association for Computing Machinery, Inc. (1992).*

Gelernter, David, "The Cyber–Road Not Taken", The Washington Post (Apr. 3, 1994).*

Retrospect User's Guide, version 3 first edition, Dantz Development Corp., Orinda, CA, 1989–1995.

Lotus Magellan Explorer's Guide, Lotus Development Corporation, Cambridge, MA, 1989.

David P. Gobel, Using Lotus Magellan, Que Corporation, Carmel, IN, 1989.

Inside Macintosh, Addision–Wesley Publishing Company, Reading, Massachusetts, Aug. 1992.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6, 9-17, 20, 22 and 25-29 is confirmed.

New claims 34-47 are added and determined to be patentable.

Claims 7, 8, 18, 19, 21, 23, 24 and 30-33 were not reexamined.

34. *A method as in claim 13 including displaying on a display device only the data units that are within a segment of a stream selected from the main stream and the at least one substream, without at the same time displaying data units that are within the selected stream but not within said segment, wherein the displayed data units maintain a time order of the data units as in the selected stream, and the segment corresponds to a selected interval of time shorter than the time interval of time-ordered data units in the entire selected stream, said displaying taking place while the entire selected stream persists, and said segment moving toward an earlier or a later time in response to an input from a user interface to thereby change the set of data units being displayed.*

35. *The method as in claim 34 wherein said input from the user interface comprises a manipulation of a cursor relative to a scroll bar or slide on the display device to thereby move the selected segment toward an earlier or later time in the selected stream and thus display on the display device a different set of data units from the selected stream.*

36. *The method as in claim 35 in which said displaying comprises displaying on the display device a time-based identification of the time interval corresponding to the chronological indicators of the concurrently displayed data units that are within said segment.*

37. *The method of claim 36 in which said displaying comprises displaying said data units as representations thereof in a stack of partly overlapping representations using perspective to create an illusion of increasing distance from a viewpoint implied by the displayed representations, wherein the representations at one place in the stack appear further away than the representations at another place in the stack.*

38. *The method of claim 37 in which said displaying comprises including in the displayed data units at least one data unit associated with a future time.*

39. *The method as in claim 34 in which said displaying comprises displaying on the display device a time-based identification of the time interval corresponding to the chronological indicators of the concurrently displayed data units that are within said segment.*

40. *The method of claim 39 in which said displaying comprises displaying said data units as representations thereof in a stack of partly overlapping representations using perspective to create an illusion of increasing disptance from a viewpoint implied by the displaying representations, wherein the representations at one place in the stack appear further away than the representations at another place in the stack.*

41. *The method of claim 40 in which said displaying comprises including in the displayed data units at least one data unit associated with a future time.*

42. *The method of claim 13 including displaying on a display device at least some of the data units of a stream selected from one of said main stream and said at least one substream as data unit representations in a stack of partly overlapping representations using perspective to create an illusion of increasing distance from a viewpoint implied by the displayed representations, wherein the representations at one place in the stack appear further away than the representations at another place in the stack.*

43. *The method of claim 42 in which said displaying comprises including in the displayed data units at least one data unit associated with a future time .*

44. *The method of claim 13 including selectively displaying on a display device at least some of said data units as a receding, foreshortened stack of partly overlapping data unit representations so that only a part of each of said representations in the displayed stack, after the first document in the stack, is visible to a user.*

45. *A method as in claim 44 in which said displaying comprises displaying only the data units that are within a segment of a stream selected from the main stream and the at least one substream, without at the same time displaying data units that are within the selected stream but not within said segment, wherein the displayed data units maintain a time order of the data units as in the selected stream, and the segment corresponds to a selected interval of time shorter than the time interval of time-ordered data units in the entire selected stream, said displaying taking place while the entire selected stream persists, and said segment moving toward an earlier or a later time in response to an input from a user interface to thereby change the set of data units being displayed.*

46. *A system as in claim 1 in which the means for generating a main stream of data units and at least one substream, receiving data units from other computer systems, gernerating data units, selecting a timestamp, including each data unit in the main stream, and maintaining comprise a programmed computing platform including at least one of a personal computer and a server.*

47. *A system as in claim 25 in which the means for generating a main stream of data units and at least one substream, allocating, including, maintaining, representing, selecting which data units are represented on the display device, and selecting one or more of the document representations comprise a programmed computing platform including at least one of a personal computer and a server.*

* * * * *

(12) EX PARTE REEXAMINATION CERTIFICATE (8770th)
United States Patent
Freeman et al.

(10) Number: US 6,006,227 C2
(45) Certificate Issued: Dec. 20, 2011

(54) DOCUMENT STREAM OPERATING SYSTEM

(75) Inventors: Eric Freeman, Branford, CT (US); David H. Gelernter, Woodbridge, CT (US)

(73) Assignee: Mirror Worlds, LLC, Tyler, TX (US)

Reexamination Request:
No. 90/011,605, Mar. 29, 2011

Reexamination Certificate for:
Patent No.: 6,006,227
Issued: Dec. 21, 1999
Appl. No.: 08/673,255
Filed: Jun. 28, 1996

Reexamination Certificate C1 6,006,227 issued Jun. 7, 2011

(51) Int. Cl.
*G06F 17/30* (2006.01)

(52) U.S. Cl. .................. 707/695; 707/752; 707/783; 707/914; 707/916; 707/917; 707/999.002; 707/999.007; 707/999.102; 707/E17.008; 707/E17.058

(58) Field of Classification Search .................. None
See application file for complete search history.

(56) References Cited

To view the complete listing of prior art documents cited during the proceeding for Reexamination Control Number 90/011,605, please refer to the USPTO's public Patent Application Information Retrieval (PAIR) system under the Display References tab.

*Primary Examiner* — Christopher E Lee

(57) ABSTRACT

A document stream operating system and method is disclosed in which: (1) documents are stored in one or more chronologically ordered streams; (2) the location and nature of file storage is transparent to the user; (3) information is organized as needed instead of at the time document is created; (4) sophisticated logic is provided for summarizing a large group of related documents at the time a user wants a concise overview; and (5) archiving is automatic. The documents can include text, pictures, animations, software programs or any other type of data.

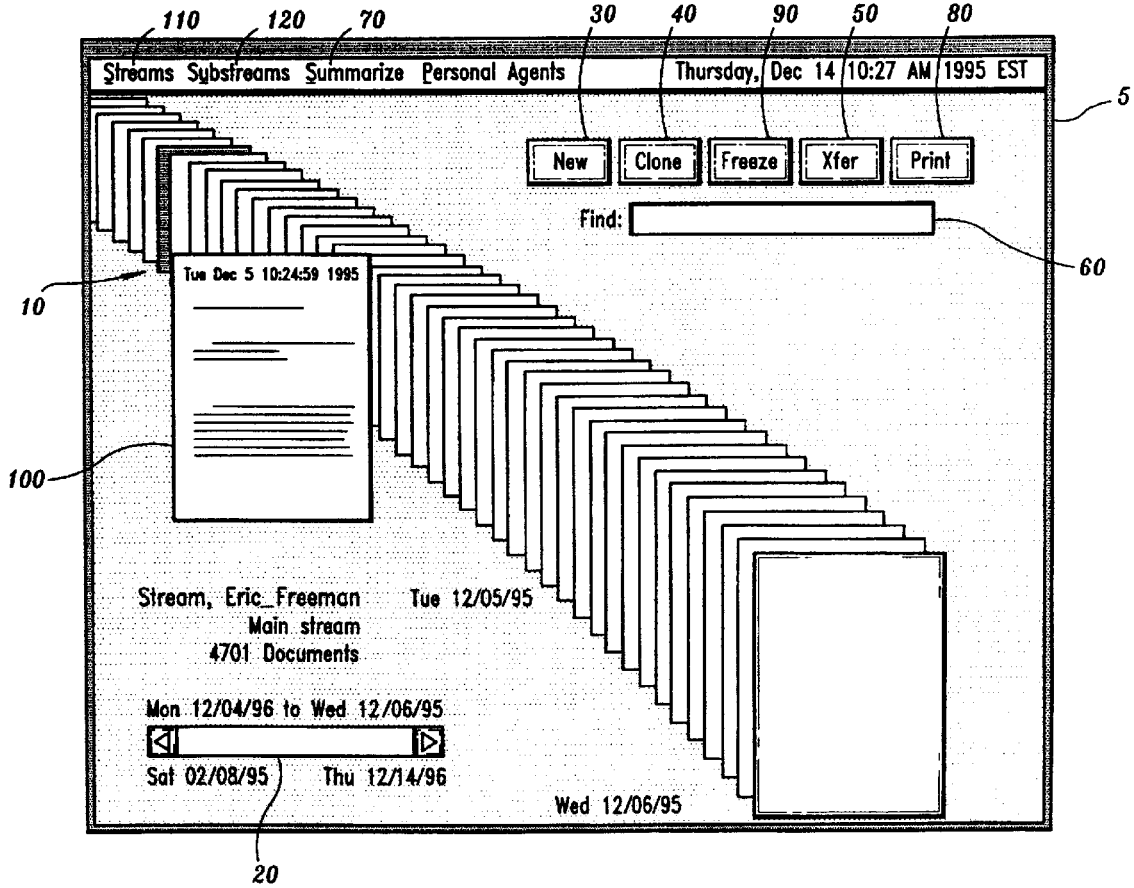

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13 and 22 is confirmed.

New claims 48-55 are added and determined to be patentable.

Claims 1-12, 14-21 and 23-47 were not reexamined.

*48. The method of claim 13, further comprising displaying only document representations that are within a selected segment of said at least one substream, without at the same time displaying document representations of data units that also are within the substream but are not within the selected segment, wherein the displayed document representations maintain a time order according to said chronological indicators, and the displayed segment corresponds to a selected interval of time shorter than the time interval of the substream, said displaying of the segment taking place while the entire substream persists, and said displaying comprises moving said displayed segment toward an earlier or a later time in response to an input from a user interface to thereby change the set of data units that are being displayed as document representations.*

*49. The method as in claim 48 wherein said input from the user comprises a sliding motion by the user communicated by the user to said computer system.*

*50. The method of claim 49 wherein said sliding motion comprises a motion relative to a scroll bar on a computer screen.*

*51. The method of claim 50 wherein said motion relative to a scroll bar comprises moving a cursor relative to the scroll bar.*

*52. The method of claim 49 further including displaying on a display device a time-based identification of the time interval corresponding to the concurrently displayed segment.*

*53. The method of claim 48 wherein said displaying comprises displaying the document representations as partly overlapping document representations using perspective to create an illusion of increasing distance from a viewpoint implied by the displayed document representations, wherein the document representations at one place in the stack appear further away than the document representations toward another place in the stack.*

*54. The method of claim 48, further comprising displaying a glance view of a data item in response to user interaction by touching the displayed document representation that corresponds to said data item.*

*55. The method of claim 13 further comprising:*

*identifying a set of data units from said main stream or at least one substream based on search criteria provided by a user,*

*displaying document representations for some, but not all, of the set of data units identified in the preceding step; and*

*displaying at different times different plural document representations of the data units in the set in response to a user selecting through a user interface element said different document representations.*

\* \* \* \* \*